(12) United States Patent
Lillo

(10) Patent No.: US 7,397,840 B1
(45) Date of Patent: Jul. 8, 2008

(54) DUAL CODE SPREAD SPECTRUM COMMUNICATION SYSTEM

(75) Inventor: Walter E. Lillo, Hermosa Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 624 days.

(21) Appl. No.: 10/623,288

(22) Filed: Jul. 17, 2003

(51) Int. Cl.
  *H04B 1/00* (2006.01)
(52) U.S. Cl. .................... 375/147; 375/148; 375/130; 375/144; 375/316
(58) Field of Classification Search ................. 375/147, 375/149, 295, 316, 148, 130, 144; 367/117
  See application file for complete search history.

(56) References Cited

U.S. PATENT DOCUMENTS

| | | | | |
|---|---|---|---|---|
| 5,111,478 A | * | 5/1992 | McDonald | .................. 375/130 |
| 5,786,791 A | * | 7/1998 | Bruckert | ...................... 342/457 |
| 5,862,172 A | * | 1/1999 | Sugita et al. | ................. 375/142 |
| 6,611,511 B1 | * | 8/2003 | Schulz | ........................ 370/342 |
| 2003/0090414 A1 | * | 5/2003 | Syrjarinne et al. | ..... 342/357.06 |

* cited by examiner

*Primary Examiner*—Mohammad H. Ghayour
*Assistant Examiner*—Leila Malek
(74) *Attorney, Agent, or Firm*—Derrick Michael Reid

(57) ABSTRACT

A direct sequence spread spectrum receiver includes a first spreading code generator for receiving a first channel signal spectrum spread by a first spread code, while a second group of receivers use a second spreading code, where the first and second codes are partially correlated, so that, the first group of receivers receive all messages communicated while the second group of receivers only receives a portion of the messages. In this manner, a spread spectrum broadcast system can selectively communicate to a selected portion of receivers in a whole group of receivers by simply switching the spreading code at the transmitter.

4 Claims, 2 Drawing Sheets

SPREADING CODE DETECTION RECEIVER

DEGRADED SPECTRUM SPREADING COMMUNICATION SYSTEM

DUAL CODE AUTOCORRELATION GRAPH

SPREADING CODE DETECTION RECEIVER

DUAL CODE SPREAD SPECTRUM COMMUNICATION SYSTEM

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of direct sequence spectrum spreading (DSSS) communications systems. More particularly, the present invention relates to DSSS communications for selectively communicating from a transmitter to a select portion of a group of receivers using switched spreading codes.

BACKGROUND OF THE INVENTION

Spread spectrum communication systems use direct sequence spread spectrum (DSSS) codes for spectrum spreading channel signals communicated over respective communication channels and over a common channel bandwidth. Prior to transmission, an input signal having a narrow frequency spectrum, is spectrum spread by mixing the input signal with the DSSS code for providing a spread spectrum channel signal that has a spread spectrum extending in frequency over a wide channel bandwidth. The power spectra density of the communicated channel signal is spread over the channel bandwidth and is difficult to acquire without advance knowledge of the spreading code. As such, the communication system uses code division signaling for maintaining cochannel isolation of the multiple channel signals communicated over the channel bandwidth. Signal components of a channel signal are spread over the channel bandwidth providing low power components across the bandwidth rendering the isolation and reception of the input signal difficult without advance knowledge of the spreading code for correlation with the channel signal of interest. In order to reconstitute the spectrum spread signal upon reception, the channel signal is despread by correlating the received channel signal by a replica code generated in the receiver.

In a transmitter, spectrum spread channel signals are superimposed as an output signal that modulates a carrier for communicating by code division a plurality of channel signals, each of which is spectrum spread by the respective spreading code. Hence, each channel uses a respective spreading code, and hence, each receiver is equipped with a respective spreading code used for isolating a respective channel signal so that each receiver can acquire one and only one respective channel signal. During acquisition in the receiver, code phase is determined using the autocorrelation properties of the spreading code. When the receiver replica code is phase shifted in time to coherently match the code phase of the incoming channel signal, the signal is reconstituted and can be detected during code phase lock. When the code phase shifts, there is a drop in the level of the detection signals, and hence a lock drop preventing acquisition of the channel signal. Hence, the receivers automatically adjust the code phase of the replica code to dynamically match the code phase of the invention channel signal so as to maintain code lock during continuous reception of the channel signal. In the event the replica code has a large code phase differential, coherently code phase lock is lost, and the signal cannot be reconstituted nor detected.

The use of spreading codes have long been used to isolate channel signals so that only receivers with predetermined codes can only receive channel signals spectrum spread by the particular respective codes. In practice, each user or receiver is assigned apriori a respective unique spreading code. In some situations, a common channel signal can be broadcast to a plurality of receivers all having the same identical spreading code, such as in the broadcast of a GPS signal from a satellite to a plurality of GPS receivers each having the same spreading code for respective coherent reception. That is, the spreading code is used to broadcast a DSSS channel signal to a group of users all having a receiver generating a replica of the same spreading code for receiving the broadcasted signal. Once the grouped receivers are equipped with the same replica code, all user receivers will receive the same information at all times. In the presence of a jamming signal, all receivers will be equally jammed and communications will be equally jammed amongst all of the users. In clandestine or black out communications, it may be desirable to send a communication to a selected segment of the group and not to others of the group at various times. Such selective communications can be used in field operations where a first group is a friendly or desired group of recipients and the second group is a hostile or undesired group of recipients. Such selective communications during the broadcast of a spread spectrum signal could be used to communicate with the entire group at one time, and a preferred portion of that group at another time. Conventional broadcast spread spectrum communication systems using a single spreading code prevents time variable selective communications to a portion of a group of receivers. These and other disadvantages are solved or reduced using the invention.

SUMMARY OF THE INVENTION

An object of the invention is to provide a communication system that broadcasts upon transmission a channel signal using a plurality of spreading codes at respective different times for selective communication to a plurality of receivers.

Another object of the invention is to provide a communication system that broadcasts upon transmission a channel signal using a plurality of spreading codes at respective different times for selective communication to differing segments of the plurality of receivers at the respective different times.

Yet another object of the invention is to provide a communication system having a plurality of receivers for receiving a broadcast channel signal spectrum spread at different times by respective spreading codes.

The present invention is directed to a spread spectrum broadcast communication system that selectively communicates a spread spectrum channel signal by differing spreading codes at differing times to a group of receivers. A first portion of the receivers receive the channel signal at a first time using a first spreading code and a second portion of the receivers receives the channel signal at a second time using a second spreading code. In the preferred form, a transmitter transmits a first channel signal at a first time period using a first spreading code and transmits a second channel signal at a second time period using a second spreading code, while, a first portion of the receivers generate a replica of the first spreading code for receiving the first channel signal during the first time period and a second portion of the receivers generate replicas of the first and second spreading code for receiving the first channel signal during the first time period and for receiving the second channel signal during the second time period, respectively, using spreading code detection for determining which spreading code is currently being used to transmit the broadcast signal. In the preferred form, all of the receivers receive and correlate the first channel signal during a first time period, but only a portion of the receivers receive and fully correlate the second channel signal during the second time period. In this manner, the first message is communicated in the first channel signal to all of the receivers while a second message is communicated in the second channel signal to only a subset of all of the receivers for selective communications within a group of receivers. Hence, the broadcast communication system can be used for sending secret messages to a portion of a group of receivers at one time and for sending public messages to the entire group at another time. These and other advantages will become more apparent from the following detailed description of the preferred embodiment.

DETAILED DESCRIPTION OF THE PREFERRED EMBODIMENT

Figure 1:
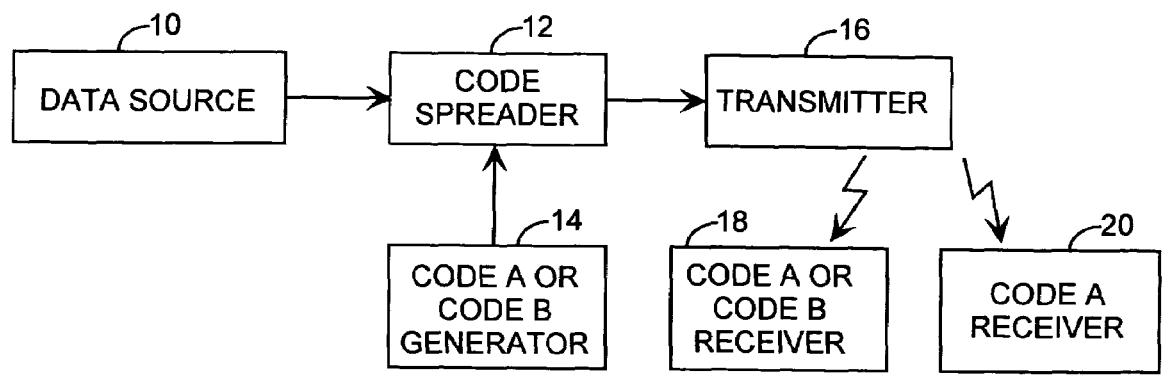
FIG. 1 is a block diagram of a degraded spectrum spreading communication system.
Figure 2:
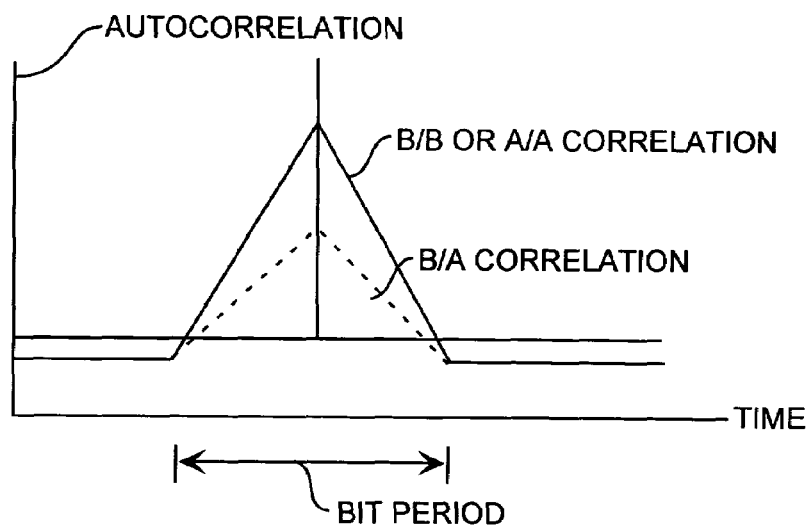
FIG. 2 is a dual code autocorrelation graph.

An embodiment of the invention is described with reference to the figures using reference designations as shown in the figures. Referring to FIG. 1, a data source 10 provides messages in the form of sequence of data bits that are spectrum spread by a code spreader 12. A code generator 14 generates an original spreading code A during a first time period when the data source is providing a first message in the form of a first sequence of data bits, and, the code generator 14 generates an original spreading code B during a second time period when the data source 10 provides a second message in the form of a second sequence of data bits. The code spreader 12 spectrum spreads the first sequence of data bits that then modulates a carrier by the transmitter 16 that then broadcasts the first channel signal. The code spreader 12 spectrum spreads the second sequence of data bits that then modulates a carrier by the transmitter 16 that then broadcasts the second channel signal. Modulation of the carrier by a sequence of symbols encoded from the sequence of data bits for broadcast transmission is well known.

The broadcasted channel signal is received by a group of receivers 18 and 20. A first portion of receivers 18 of the receivers generate a replica spreading codes A and B respectively for both original spreading codes A and B for receiving the first and the second messages. A second portion of receivers 20 of the receivers only generate a replica of the spreading code only for receiving only the first message. When a receiver despreads the channel signal using a replica code identical to the original code with coherent code phase over a bit period, the autocorrelation is high so that the received channel signal has a maximum received signal strength upon which the receiver processes the received channel signal for sequence data detection. When the original spreading code A is used for spectrum spreading and the replica spreading code A is used for spectrum despreading, there is a maximum A/A correlation of the received signal. When the original spreading code B is used for spectrum spreading and the replica spreading code B is used for spectrum despreading, there is a maximum B/B correlation of the received signal. When the original spreading code A is used for spectrum spreading and the replica spreading code B is used for spectrum despreading, with less than perfect correction between the codes A and B, there is also a B/A correlation of the received signal but with a lower maximal correlation. The autocorrelation is degraded when the replica code is not identical to the original code. When the first portion of the receivers 20 use replica code B when the transmitter is using original code A, the first group of receivers cannot receive the first message. That is, the degradation can be severe so as to prevent coherent code phase lock, as well as losing carrier tracking and bit timing tracking. Coherent code phase tracking using early and late correlations, carrier tracking, and bit timing tracking are well known.

Figure 3:
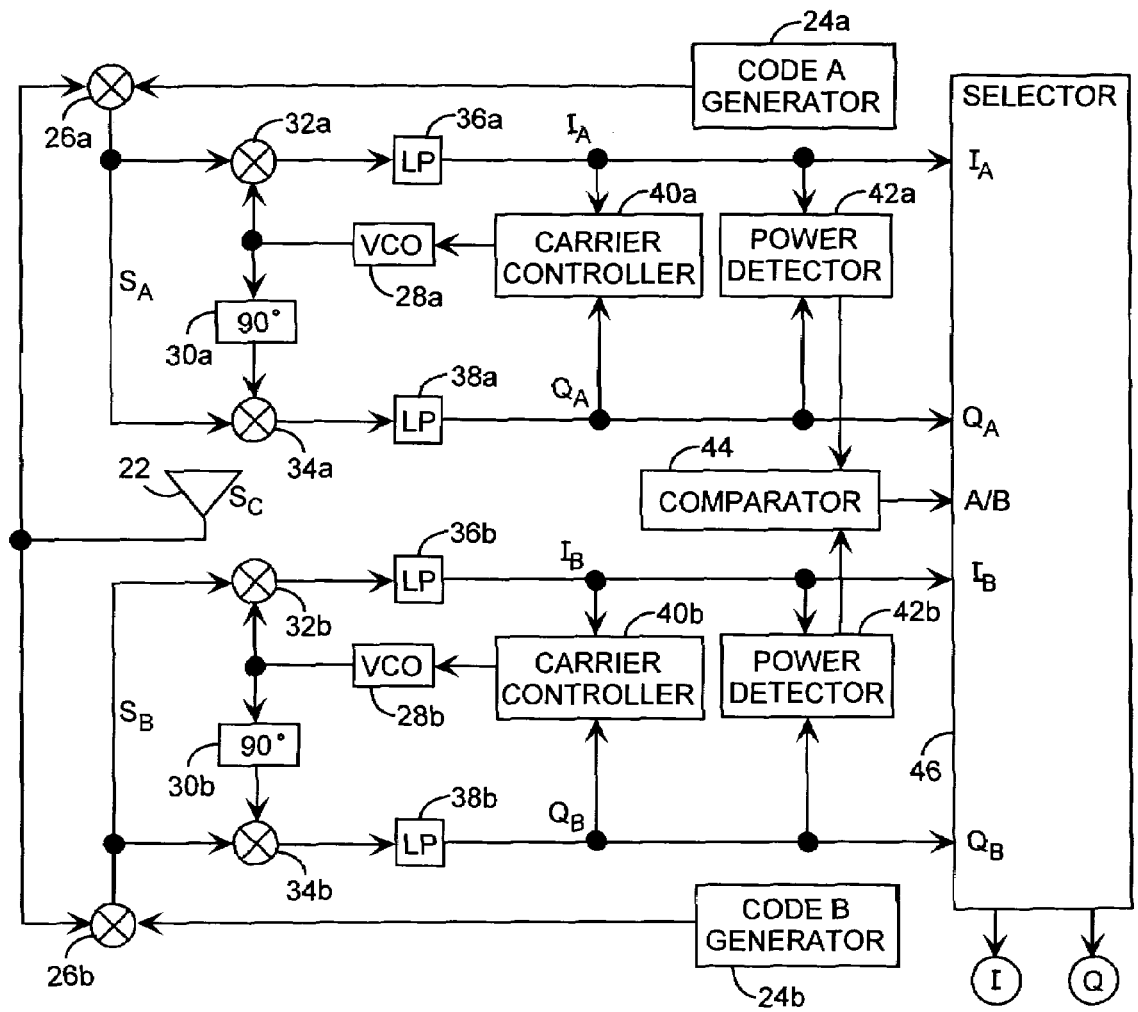
FIG. 3 is a block diagram of spreading code detection receiver.

Referring to all of the figures, and more particularly to FIG. 3, a spreading code detection receiver is configured to receive a channel signal spread by the two spreading codes A and B. The channel signal $S_C$ is received through an antenna 22 and despread by two or more spreading codes, though in the exemplar form only two spread codes A and B are used. Multiple spreading codes are used by time division in the transmitter and hence are not concurrently used for spreading but are concurrently used during reception. A spreading code A generator 24a generates the replica spreading code A and a spreading code generator 24b generates the replica spreading code B, preferably at all times. The replica spreading codes A and B are generally positively correlated with the original spreading codes A and B, respectively, used to spectrum spread the channel signal. The channel signal $S_C$ is received through a receiver antenna 22. The channel signal $S_C$ is then concurrently despread by code A using despreader 26a to generate received signal $S_A$, and despread by code B using despreader 26b to generate received signal $S_B$, at the front end of two receiver channels A and B. The receiver channels respectively include carrier controlling 24a and 24b, voltage control oscillators (VCOs) 28a and 28b, and 90° phase shifter 30a and 30b, for generating a sin and cosine replica carriers. The sin and cosine replica carriers in channel A are used for coherent demodulation of the carrier in I and Q quadrature using demodulators 32a and 34a in channel A for respectively generating an inphase $I_A$ signal passed through a low pass filter 36a, and for generating a quadrature $Q_A$ signal passed through a low pass filter 38a. The sin and cosine replica carriers in channel B are used for coherent demodulation of the carrier in I and Q quadrature using demodulators 32b and 34b in channel B for respectively generating an inphase $I_B$ signal passed through a low pass filter 36b, and for generating a quadrature $Q_B$ signal passed through a low pass filter 38b. Coherent carrier tracking, VCO control, sin and cosine replica carrier generation, and carrier demodulation are well known techniques. The $I_A$ and $Q_A$ signals are fed into a channel A power detector 42a for determining the average power of the $I_A$ and $Q_A$ signals as a channel A power signal. The $I_B$ and $Q_B$ signals are fed into a channel B power detector 42a for determining the average power of the $I_B$ and $Q_B$ signals as a channel B power signal. The A and B power signal are fed to a comparator that provide an A/B signal indicating which of the two channels has the highest power of the I and Q quadrature signals. The A/B signal is fed into selector 46 that selects either the $I_A$ and $Q_A$ signals of channel A or the $I_B$ and $Q_B$ signals of channel B, and the I and Q output signal.

In system operation, as the broadcast system switches from the first to the second messages while concurrently switching from using the spreading code A to using the spreading code B, A channel power signal drops as the B channel signal increases, which causes the comparator to toggle, such that, the I and Q outputs of the selector switches from providing the $I_A$ and $Q_A$ signals to providing the $I_B$ and $Q_B$ signals. Hence, the spreading code detection receiver can receive both the first and second messages. It should now be apparent that the code A receiver 20 can only receive the first message using the spreading code A in a conventional manner, but that the code A or code B receiver 18 can receive both the first message using the spreading code A and the second message using the spreading code B. In this manner, a broadcast message, such as the second message, can be selectively received by one group of receivers, such as code A and code B receivers 18, and not by another group of receivers, such as the code B only receiver 20.

The invention has selective jamming applications. A communication system provides an information service to the whole group of receivers while at the same time maintaining the ability to nominally provide the information to the whole group but deny certain information to unauthorized users in a localized area, while assuring that the authorized users in that localized area could continue to have access to the broadcasted information. A broadcast signal is transmitted using a single high powered code. All unauthorized users access to a code, which only partially correlates with the satellites code, while the authorized users get the code used by the satellite. This partial correlation can be had by randomly flipping a percentage of the bits, for example, one in three, so that the despreading code is similar to but not exactly the transmit spreading code. Under normal conditions, the unauthorized code allows the unauthorized users to get enough of the information of interest but at a greatly reduced power level due to reduced correlation. Given the power differential available to the authorized and unauthorized user, a jamming that at the carrier frequency would have enough signal so as to affect the unauthorized user while not affecting the authorized user.

The ability to track a signal is related to the ratio of the post correlation signal power to noise power. The signal to noise ratio can be taken at various points in the receiver so it is important to distinguish between the precorrelation signal to noise and the post correlation signal to noise. The authorized and unauthorized users have the same precorrelation signal to noise because each is receiving the same input signal. The code used by the unauthorized user is only partially correlated with the incoming signal and as a result the post correlation signal power of the unauthorized user is only a fraction of the post correlation signal power of the authorized user. The post correlation noise level would be the same for both the authorized and the unauthorized user. Because the post correlation signal level of the authorized user is greater than that of the unauthorized user, a jamming signal can then jam the unauthorized user without jamming the authorized user having a higher signal to noise ratio. Hence, broadcasting using the same code to two groups of receivers, one group of authorized users using full correlation by using the same transmitted code, and the other group of unauthorized users using partial correlation by using a similar code that is not exactly the same as the transmitted code, in the presence of a jamming signal, would provide communications only to the authorized group and not to the unauthorized group. When the jamming signal is discontinued, both groups would then receive the same information. In this way, a jamming signal could be used to selectively communicate to one of the two receiving groups.

In the preferred exemplar form only two codes are used, but other combinations of codes and receiver groups can vary. The spreading codes used, the number of codes, and the number of groups of receivers are design parameters in such a selective broadcast system. The codes should be chosen so that the separation in power between the correctly demodulated signal and the incorrectly demodulated signal is maximized for detection purposes. Those skilled in the art can make enhancements, improvements, and modifications to the invention, and these enhancements, improvements, and modifications may nonetheless fall within the spirit and scope of the following claims.

What is claimed is:

1. A communication system for broadcasting a channel signal, the system comprising,
   a detection receiver for receiving the channel signal having a modulated carrier for communicating first messages using a first spreading code and communicating second messages using a second spreading code, the detection receiver comprising:
   a first replica spreading code generator providing a first replica spreading code;
   a second replica spreading code generator providing a second replica spreading code;
   a first despreader for despreading the channel signal into a first despread signal;
   a second despreader for despreading the channel signal into a second despread signal;
   a first carrier demodulator for carrier demodulating the first despread signal into first quadrature signals;
   a second carrier demodulator for carrier demodulating the second despread signal into second quadrature signals;
   a first power detector for detecting the power level of the first quadrature signal for providing a first power signal;
   a second power detector for detecting the power level of the second quadrature signal for providing a second power signal;
   a comparator for determining which one of the first power signal or the second power signal is present; and
   a selector for selecting and providing the first quadrature signal when the first power signal is present or for selecting and providing the second quadrature signal when the second power signal is present, the first quadrature signal communicating the first message when the first power signal is present, the second quadrature signal communicating the second message when the second power signal is present,
   the system further comprising,
   a data source for providing the first message during a first time period when the first power signal is present and for providing the second message during a second time period when the second power signal is present,
   a code generator for generating an original first spreading code and an original second spreading code,
   a spreader for spectrum spreading the first message by the original first spreading code and for spectrum spreading the second message by the original second spreading code, the first replica spreading code being a replica of the original first spreading code, the second replica spreading code being a replica of the original second spreading code, the first message and second message are spectrum spread into first and second spread spectrum signals,
   a transmitter for broadcasting the channel signal by modulating a carrier by the first spread spectrum signal during the first time period and by the second spread spectrum signal during the second time period, and
   a first code receiver for receiving the first message during the first time period, the transmitter communicating to the detection receiver and to the first code receiver dur ing the first time period, the transmitter selectively communicating to the detection receiver and not the first code receiver during the second time period.

2. The system of claim 1 further comprising,
a plurality of detection receivers receiving the first and second messages.

3. The system of claim 1 further comprising
a plurality of first code receivers for receiving the first messages.

4. The system of claim 1 wherein,
the first and second codes are partially correlated.

* * * * *